(12) United States Patent
Kojima

(10) Patent No.: US 9,259,061 B2
(45) Date of Patent: Feb. 16, 2016

(54) FASTENING MEMBER AND SLIDE FASTENER

(75) Inventor: Masayoshi Kojima, Toyama (JP)

(73) Assignee: YKK Corporation (JP)

( * ) Notice: Subject to any disclaimer, the term of this patent is extended or adjusted under 35 U.S.C. 154(b) by 63 days.

(21) Appl. No.: 13/808,662

(22) PCT Filed: Jul. 7, 2010

(86) PCT No.: PCT/JP2010/061556
§ 371 (c)(1),
(2), (4) Date: Jan. 7, 2013

(87) PCT Pub. No.: WO2012/004871
PCT Pub. Date: Jan. 12, 2012

(65) Prior Publication Data
US 2013/0097819 A1 Apr. 25, 2013

(51) Int. Cl.
*A44B 19/06* (2006.01)
*A44B 19/14* (2006.01)
(Continued)

(52) U.S. Cl.
CPC ............... *A44B 19/06* (2013.01); *A44B 19/14* (2013.01); *A44B 19/26* (2013.01); *B29C 45/0013* (2013.01); *B29D 5/02* (2013.01); *B32B 5/16* (2013.01); *B29K 2505/02* (2013.01); *Y10T 24/2543* (2015.01); *Y10T 24/2561* (2015.01); *Y10T 428/256* (2015.01)

(58) Field of Classification Search
CPC ........ A44B 19/02; A44B 19/04; A44B 19/06; Y10T 24/2539; Y10T 24/255; Y10T 24/2552; Y10T 24/2554; Y10T 24/2555; Y10T 24/2557; Y10T 24/2559
USPC .................. 24/403–406, 408–414
See application file for complete search history.

(56) References Cited

U.S. PATENT DOCUMENTS

| 4,429,438 A | 2/1984 | Takeshima et al. |
| 4,842,799 A | 6/1989 | Kusayama |

(Continued)

FOREIGN PATENT DOCUMENTS

| JP | 57-31802 A | 2/1982 |
| JP | 58-58003 A | 4/1983 |

(Continued)

OTHER PUBLICATIONS

"Table 2—Permeability Coefficient of Common Polymers (Plastics)", Welding Journal, p. 37.*

(Continued)

*Primary Examiner* — Abigail Morrell
(74) *Attorney, Agent, or Firm* — Kilpatrick Townsend & Stockton LLP

(57) ABSTRACT

A fastening member contains a synthetic resin, in which flat metal foil containing aluminum is mixed with the synthetic resin and an average particle diameter of the metal foil is set to be equal to or more than 3 μm and equal to or less than 8 μm. Accordingly, the fastening member has both an advantage of a synthetic resin of being inexpensive and light and an advantage of a metal of having strength and gloss having a high-grade sense, and an outer appearance or a texture thereof can be viewed like the metallic member. In the fastening member, a weld mark can be restrained from being generated, and even if the weld mark is generated, the weld mark can be made difficult to be visually recognized relatively and the weld mark can be mixed with the gloss.

8 Claims, 10 Drawing Sheets

(51) Int. Cl.
  *B29C 45/00* (2006.01)
  *B29D 5/02* (2006.01)
  *A44B 19/26* (2006.01)
  *B32B 5/16* (2006.01)
  *B29K 505/02* (2006.01)

(56) References Cited

U.S. PATENT DOCUMENTS

| | | | |
|---|---|---|---|
| 5,035,029 A | 7/1991 | Horita et al. | |
| 7,353,570 B2 * | 4/2008 | Himi | 24/405 |
| 2006/0260104 A1 | 11/2006 | Himi | |

FOREIGN PATENT DOCUMENTS

| | | | |
|---|---|---|---|
| JP | 61-277419 A | 12/1986 |
| JP | 62-236502 A | 10/1987 |
| JP | 3-12103 A | 1/1991 |
| JP | 2000-159926 | 1/1998 |
| JP | 2001-300966 A | 10/2001 |
| JP | 2003-49082 A | 2/2003 |
| JP | 2003-191932 A | 7/2003 |
| JP | 2003-225102 A | 8/2003 |
| JP | 2006-320642 A | 11/2006 |
| TW | 200621902 | 7/2006 |

OTHER PUBLICATIONS

English Translation of JP 58058003.*
English Translation of JP 2000-159926.*
International Search Report, PCT Application No. PCT/JP2008/061377, mailed Sep. 14, 2010.

* cited by examiner

FASTENING MEMBER AND SLIDE FASTENER

This application is a national stage application of PCT/JP2010/061556 which is incorporated herein by reference.

TECHNICAL FIELD

The invention relates to a fastening member of a synthetic resin, and particularly, to a fastening member, such as a fastener element, where metal foil of aluminum is mixed with a synthetic resin to provide glossiness, and a slide fastener having the fastening member.

BACKGROUND ART

Fastening products such as slider fasteners, snap buttons, and buckles have been generally used until now as means for coupling two members. Various fastening members such as fastener elements are disposed in fastening products such as slider fasteners, and many fastening members are injection-molded of a synthetic resin in that the fastening members are inexpensive and can easily correspond to various shapes. However, such fastening members of a synthetic resin generally lack in glossiness, and thus a high-grade sense cannot be realized in the fastening products.

Meanwhile, when glossiness is given to a fastening product to show a high-grade sense, a fastening member, for example, such as a fastener element may be formed of a metal such as copper or aluminum. However, manufacturing costs for a fastening product having such a metallic fastening member are high as compared with a case of using a fastening member of a synthetic resin, and a manufacturing method thereof also requires a plurality of processes and thus is complex.

Further, a metallic fastening member is heavier than a fastening member of a synthetic resin, and thus when a fastening product is attached to an end product such as clothes or a bag, weight of the end product itself increases. Thus, for example, in a product pursuing light weight, even when glossiness is to be given to a fastening product, a synthetic resin fastening member cannot but be selected in terms of costs and weight in some cases.

In order to solve such a problem, for example, Japanese Patent Application Laid-Open No. 58-58003 (Patent Document 1) discloses a slide fastener where at least one of a slider and a fastener element is formed of a thermoplastic synthetic resin mixed with metal foil containing aluminum. In this case, Patent Document 1 describes that it is preferable that the metal foil mixed with the synthetic resin has a size of 200 μm×280 μm or a size of 100 μm×140 μm.

In this way, as a slider or a fastener element are injection-molded of a synthetic resin mixed with metal foil having the above-described size, glossiness may be given to the slider or the fastener element to improve an appearance quality (aesthetic sense) of the slide fastener. Further, according to Patent Document 1, through the mixing of the metal foil, the slider or the fastener element is formed to be firm and an impact-resistant force increases.

However, for example, the specification of Japanese Patent No. 3994245 (Patent Document 2) discloses an aluminum flake which is controlled to have a particle size in a predetermined range as an invention relating to aluminum metal foil (aluminum flakes) mixed with a synthetic resin during injection molding.

For example, when a synthetic resin mixed with aluminum flakes having a relatively large size (particle size) is injection-molded, a flow of a melted resin in a cavity of a mold deteriorates due to the mixing of the aluminum flakes or stains are caused in the flow of the melted resin, and thus a mixing ratio of the metal foil may be partially lower in a formed product. As a result, in the formed product, as the mixing ratio of the metal foil is low, a partially discolored weld mark may be formed and thus may cause an appearance defect of the formed product.

In regard to the appearance defect problem, the aluminum flake disclosed in Patent Document 2 is controlled such that an average particle diameter thereof by a laser diffraction method is 2 to 8 μm and particles having a size of not less than 10 μm occupies not more than 5.0 wt %. Further, the aluminum flake is controlled such that an average thickness thereof is 0.1 to 0.6 μm, and a linear gradient n of the particle distribution is not less than 2.1.

According to Patent Document 2, for example, when mixed with a synthetic resin such as polyethylene to be injection-molded, the aluminum flakes whose particle size is controlled to the above-described range may restrain a weld mark from being generated in the formed product to a degree where the weld mark cannot be visually recognized or does not lower a product value.

Thus, according to Patent Document 2, the aluminum flakes whose particle size is controlled to the above-described range are properly used when a formed product including an optical device such as a camera or a video camera, an acoustic device such as a radio cassette or a CD player, an OA device such as a PC or a display, and interior/exterior equipment of a vehicle or a motor cycle is injection-molded.

PRIOR ART DOCUMENT

Patent Document

Patent Document 1: Japanese Patent Application Laid-Open No. 58-58003
Patent Document 2: Japanese Patent No. 3994245

SUMMARY OF THE INVENTION

Problems to be Solved by the Invention

In the slider fastener disclosed in Patent Document 1, a size of the metal foil mixed with a synthetic resin is relatively large as described above, and thus the injection-molded slider or fastener element has a lame shape where the metal foil is scattered and it is difficult to obtain a glossiness having a high-grade sense as in a metallic fastening member. Further, when the mixed metal foil is large, the fastening member itself becomes relatively heavy, and since the synthetic resin is fragmented by the metal foil, there is a concern that strength thereof may be lowered.

Further, when a synthetic resin mixed with metal foil having a relatively large size is injection-molded as in Patent Document 1, a flow of a melted resin deteriorates in a cavity or stains are generated in a flow of the melted resin as described above, and thus a weld mark causing an outer appearance defect in the slider or the fastener element is significantly generated.

Meanwhile, Patent Document 2 describes that, when aluminum metal foil (aluminum flakes) whose particle size is controlled to a predetermined range is mixed with a synthetic resin to be injection-molded, generation of a weld mark may be restrained to a degree where the weld mark cannot be visually recognized or cannot lower a product value as described above, it is difficult to perfectly prevent generation of a weld mark actually.

For this reason, for example, when injection-molding a large formed product including an optical device such as a camera or a video camera or interior/exterior equipment of a vehicle or a motor cycle as described in Patent Document 2, a weld mark is restrained from being generated, but a weld mark which is not restrained completely may be locally formed on an outer surface (particularly, on an outer flat surface) of the formed product. In this way, if a weld mark is locally generated on a relatively large plane, the weld mark may stand out even if a size thereof is small, lowering an outer appearance quality of a formed product.

The invention has been made in an effort to solve the above-described problems, and a specific object is to provide a fastening member which, even when injection-molded of metal foil of aluminum mixed with a synthetic resin, is made such that an outer appearance defect due to a weld mark may not be visually recognized and has both an advantage of a synthetic resin of being inexpensive and light and an advantage of a metal of achieving strength and gloss of a high-grade sense, and a slide fastener having the fastening member.

Means for Solving the Problems

In order to achieve the above object, a fastening member provided by the invention is a fastening member containing a synthetic resin as a basic configuration, characterized in that flat metal foil containing aluminum is mixed with the synthetic resin, and an average particle diameter of the metal foil is set to be equal to or more than 3 μm and equal to or less than 8 μm.

In the fastening member according to the invention, it is preferred that the metal foil contained in the synthetic resin may be equal to or more than 0.4 wt % and equal to or less than 5.0 wt %.

Further, it is preferred that the fastening member according to the invention has at least one flat surface on an exposure surface exposed to the outside, and areas of the flat surfaces are set to be equal to or more than 0.4 mm$^2$ and equal to or less than 4.0 mm$^2$. Meanwhile, an exposure surface of the fastening member exposed to the outside may include only a curved surface or a convexo-concave surface. Further, it is preferred that the synthetic resin has permeability.

It is preferred that the fastening member of the invention is a fastener component forming a slide fastener.

In this case, the fastener component is a fastener element, and it is preferred that the fastener element has a body portion fixed to a fastener tape and a head portion extending from the fastener tape, and a first element half part of the fastener element exposed to the outside has a first element surface disposed on a surface side of the body portion in the tape front/back direction, and a second element surface inclined downward toward a tip end of the head portion from the first element surface.

Further, it is preferred that the first element surface is formed such that a size in the tape length direction gradually decreases toward a tape inner side of the fastener tape, and the second element surface is formed such that a size in the tape length direction gradually decreases toward a tape outer side of the fastener tape.

In addition, it is preferred that the first element half part further has a third element surface inclined downward toward a front side of the fastener tape in a length direction from the first element surface, and a fourth element surface inclined downward toward a rear side from the first element surface.

Meanwhile, the fastener component is a fastener element, the fastener element may have a body portion fixed to a fastener tape and a head portion extending from the fastener tape, the first element half part of the fastener element exposed to the outside may have a first element surface disposed on a surface side of the body portion in a tape front/back direction, and a stepped portion or a concaved recess may be disposed on the first element surface.

In the invention, it is preferred that a gate trace formed during injection-molding of the fastener element is disposed in a second element half part which is not exposed to the outside.

Further, it is preferred that a size of the fastener tape in the tape length direction in the fastener element is set to be equal to or more than 1.2 mm and equal to or less than 3.5 mm, a size in the tape width direction is set to be equal to or more than 3.0 mm and equal to or less than 5.0 mm, and a size in the tape front/back direction is set to be equal to or more than 2.0 mm and equal to or less than 3.5 mm.

Next, according to the invention, a slide fastener including a fastening member having the above-described configuration is provided.

It is preferred that the slide fastener according to the invention has a slider where metal foil of aluminum is attached to a surface thereof. Further, it is preferred that the slider is formed of an impermeable synthetic resin.

Effect of the Invention

The fastening member according to the invention is a part used for a fastening product such as a slide fastener, and for example, includes a fastener element for a slider fastener, upper and lower stoppers, a separable bottom end stop, a slider, a snap button or a cover body for a snap button, a male member and a female member for a buckle, a cord stopper, and a rotary ring. The fastening member of the invention is formed of a synthetic resin with which flat metal foil containing aluminum is mixed, and an average particle diameter of the metal foil is set to be equal to or more than 3 μm and equal to or less than 8 μm.

That is, the fastening member of the invention is obtained, for example, by injection-molding a synthetic resin with which a plurality of metal foil pieces having an average particle diameter which is very small as compared with Patent Document 1 is mixed. The fastening member is mainly formed of a synthetic resin, and thus, for example, has an advantage of being inexpensive and light as compared with a metallic fastening member. In addition, in the fastening member, a plurality of small metal foil pieces whose average particle diameter is controlled to be equal to or more than 3 μm and equal to or less than 8 μm is uniformly mixed with a synthetic resin, and thus gloss having a high-grade sense is given to the entire member, and a predetermined strength is stably obtained through the mixing of the metal foil pieces.

Here, when an average particle diameter of the metal foil pieces is less than 3 μm, the metal foil pieces are too small to stably obtain gloss. Meanwhile, when an average particle diameter of the metal foil pieces is more than 8 μm, the metal foil pieces are so large that the fastening member is formed in a lame shape. For this reason, gloss having a high-grade sense cannot be stably given to the fastening member and a texture such as that of a metal cannot be obtained.

In addition, in the fastening member of the invention, an average particle diameter of the plurality of metal foil pieces mixed with the synthetic resin is controlled to be as small as less than 8 μm, and thus a flow of the melted resin in a cavity of a mold can be restrained from deteriorating during injection molding and a desired shape can be stably formed.

Moreover, the fastening member of the invention is very small as compared with a formed product including an optical device such as a camera or a video camera or interior/exterior equipment of a vehicle or a motor cycle as described in, for example, Patent Document 2 and a size of a plane (flat surface) disposed on a surface (outer surface) of the fastening member becomes small (narrow) essentially.

For this reason, in injection molding of the fastening member, even if generation of a weld mark cannot be perfectly prevented by controlling an average particle diameter of the metal foil pieces to be small, a possibility that a weld mark may be generated on a small flat surface of the fastening member can be lowered, and the flat surface is small, so that the weld mark is made difficult to be visually recognized relatively even if a weld mark is generated on the flat surface, and thus the weld mark can be easily mixed with gloss on the flat surface portion. Thus, it is possible to effectively prevent an outer appearance defect from being generated in the fastening member due to the weld mark.

In this case, it is preferred that a thickness of the metal foil pieces is set to be equal to or more than 0.1 µm and equal to or less than 0.4 µm. In this way, the metal foil pieces have a thickness of not less than 0.1 µm and not more than 0.4 µm, and thus brilliancy and clearness of the fastening member can be improved, thereby stably obtaining a metallic texture, stabilizing a flow of a melted resin in a cavity during injection-molding, and effectively restraining generation of a weld mark.

Further, in the fastening member of the invention, the metal foil contained in the synthetic resin may be equal to or more than 0.4 wt % and equal to or less than 5.0 wt %. The containing amount (mixing amount) of the metal foil is equal to or more than 0.4 wt %, and thus gloss having a high-grade sense can be obtained. In addition, the containing amount (mixing amount) of the metal foil is equal to or less than 5.0 wt %, and thus the metal foil can be uniformly mixed with the synthetic resin, thereby preventing gloss from glittering too strongly. Furthermore, strength of the fastening member can be stably secured.

The fastening member of the invention has at least one flat surface on an exposure surface exposed to the outside, and areas of the flat surfaces are set to be equal to or more than 0.4 mm$^2$ and equal to or less than 4.0 mm$^2$. If the area of the flat surface disposed on the exposure surface of the fastening member is equal to or more than 0.4 mm$^2$, a glossy feeling given to the flat surface may be uniformly viewed, and thus a texture such as that of a metal can be given to the fastening member of the synthetic resin. Further, if the area of the flat surface disposed on the exposure surface of the fastening member is equal to or less than 4.0 mm$^2$, the weld mark can be made difficult to be visually recognized even if the weld mark is generated in the flat surface, and thus the weld mark is easily mixed with the gloss of the flat surface portion.

Meanwhile, in the fastening member of the invention, an exposure surface exposed to the outside may be only a curved surface or a convexo-concave surface. In this way, when a curved surface or a convexo-concave surface is disposed on the exposure surface of the fastening member, the gloss given to the curved surface or the convexo-concave surface can change glittering by an angle at which the fastening member is identified visually while making the surface appealing. Further, even if a weld mark is generated on the curved surface or the convexo-concave surface, a weld mark cannot be visually recognized by changing of reflection degree of light at portions of the curved surface or the convexo-concave surface.

In the invention, the synthetic resin contained in the fastening member has permeability. Accordingly, a glossy feeling obtained by the metal foil can be increased.

The fastening member of the invention can be suitably applied to a fastener component forming the slide fastener, and particularly, can be suitably applied to a fastener element among the fastener components.

Further, when the fastening member of the invention is a fastener element, the fastener element has a body portion fixed to the fastener tape and a head portion extending from the fastener tape, and a first element half part of the fastener element exposed to the outside has a first element surface disposed on a surface side in the tape front/back direction of the body portion, and a second element surface inclined downward toward a tip end of the head portion from the first element surface.

In the case of the fastener element of a synthetic resin configured in this way, even if a weld mark is formed in the first and second element surfaces of the fastener element, a weld mark may not be visually recognized due to sizes of the first and second element surfaces or a difference between reflection directions of lights on surfaces having different angles.

In this case, the first element surface is formed such that a size in the tape length direction gradually decreases toward a tape inner side of the fastener tape, and the second element surface is formed such that a size in the tape length direction gradually decreases toward a tape outer side of the fastener tape. Accordingly, even if a weld mark is formed on the first and second element surfaces, the weld mark may not be visually recognized.

Here, the tape inner side of the fastener tape refers to a direction parallel to a tape width direction of the fastener tape with respect to the fastener element and facing a tape interior (tape body portion) from the element attaching portion of the fastener tape. The tape outer side of the fastener tape refers to a direction opposite to the tape inner side, that is, a direction parallel to a tape width direction of the fastener tape with respect to the fastener element and facing the head portion from the body portion of the fastener element.

Further, the first element half part further has a third element surface inclined downward toward a front side of the fastener tape in a length direction from the first element surface, and a fourth element surface inclined downward toward a rear side from the first element surface. Accordingly, even if a weld mark is formed on the third and fourth element surfaces, a weld mark may not be visually recognized due to sizes of the first to fourth element surfaces or a difference between reflection directions of lights on surfaces having different angles.

Meanwhile, when the fastening member of the invention is a fastener element, the fastener element has a body portion fixed to a fastener tape and a head portion extending from the fastener tape, and a first element half part of the fastener element exposed to the outside has a first element surface disposed on a surface side in a tape front/back direction of the body portion. Further, a stepped portion or a concaved recess is disposed on the first element surface.

In the case of the fastener element of the synthetic resin configured in this way, even if a weld mark is formed on the first element surface of the fastener element, the first element surface is classified by the stepped portion or the concaved recess, and thus a weld mark may not be visually recognized due to a difference between reflection directions of lights on the stepped portion or the concaved recess and the first element surface.

Further, in the invention, a gate trace formed during injection-molding of the fastener element is disposed in a second element half part which is not exposed to the outside. Generally, a weld mark which is an outer appearance defect of a formed product is apt to be formed near a gate opening where a flow of a melted resin is not stable during injection molding. Thus, even if a weld mark is formed near the gate trace, the weld mark can be made difficult to be visually recognized from the outside, and thus an outer appearance quality of the fastener element can be prevented from being lowered, by disposing the gate trace (that is, the gate opening during injection molding) of the fastener element in a second element half part of the fastener element on a side which is not exposed to the outside.

In particular, the invention can be suitably applied particularly to the fastener element where a size in the tape length direction is set to be equal to or more than 1.2 mm and equal to or less than 3.5 mm, a size in the tape width direction is set to be equal to or more than 3.0 mm and equal to or less than 5.0 mm, and a size in the tape front/back direction is set to be equal to or more than 2.0 mm and equal to or less than 3.5 mm. That is, in the case of the fastener element having the size, gloss having a high-grade feeling can be given to the entire element by the metal foil mixed with the synthetic resin, and even if a weld mark is generated on the element surface, the weld mark may not be visually recognized.

Further, according to the invention, a slide fastener having the fastening member including the above-described configuration is provided. In the slide fastener, the fastening member such as a fastener element or upper and lower stoppers has both an advantage of a synthetic resin of being inexpensive and light and an advantage of a metal of obtaining strength and gloss having a high-grade feeling, and a weld mark is restrained from being generated and a weld mark itself may not be visually recognized. For this reason, the slide fastener of the invention can be suitably used in, for example, clothes or a bag which pursues light weight and a high-grade feeling.

In the slide fastener of the invention, a slider where the metal foil of aluminum is attached to a surface thereof is disposed. The slider may be manufactured by injection-molding a synthetic resin with which metal foil is mixed, like the fastener element, but the slider is large as compared with the fastener element, and thus there is a concern that a weld mark may be visually recognized when the weld mark is formed on a surface of the slider. In this regard, for example, the slider obtained by injection-molding a synthetic resin in a predetermined shape and attaching metal foil of aluminum to a surface of the obtained formed product through painting has gloss having a high-grade feeling, and thus a quality of the slider fastener can be further enhanced.

In this case, the slider certainly has gloss having a high-grade feeling even when the slider is formed of an impermeable synthetic resin.

MODE FOR CARRYING OUT THE INVENTION

Hereinafter, embodiments of the invention will be described in detail with reference to the accompanying drawings. However, the invention is not limited to the embodiments which will be described hereinbelow, but may be variously modified only if the modifications have substantially the same configuration as that of the invention and provide the same operational effects as those of the invention.
First Embodiment First, a case where a fastening product according to the invention is a slide fastener will be described.

Figure 1:
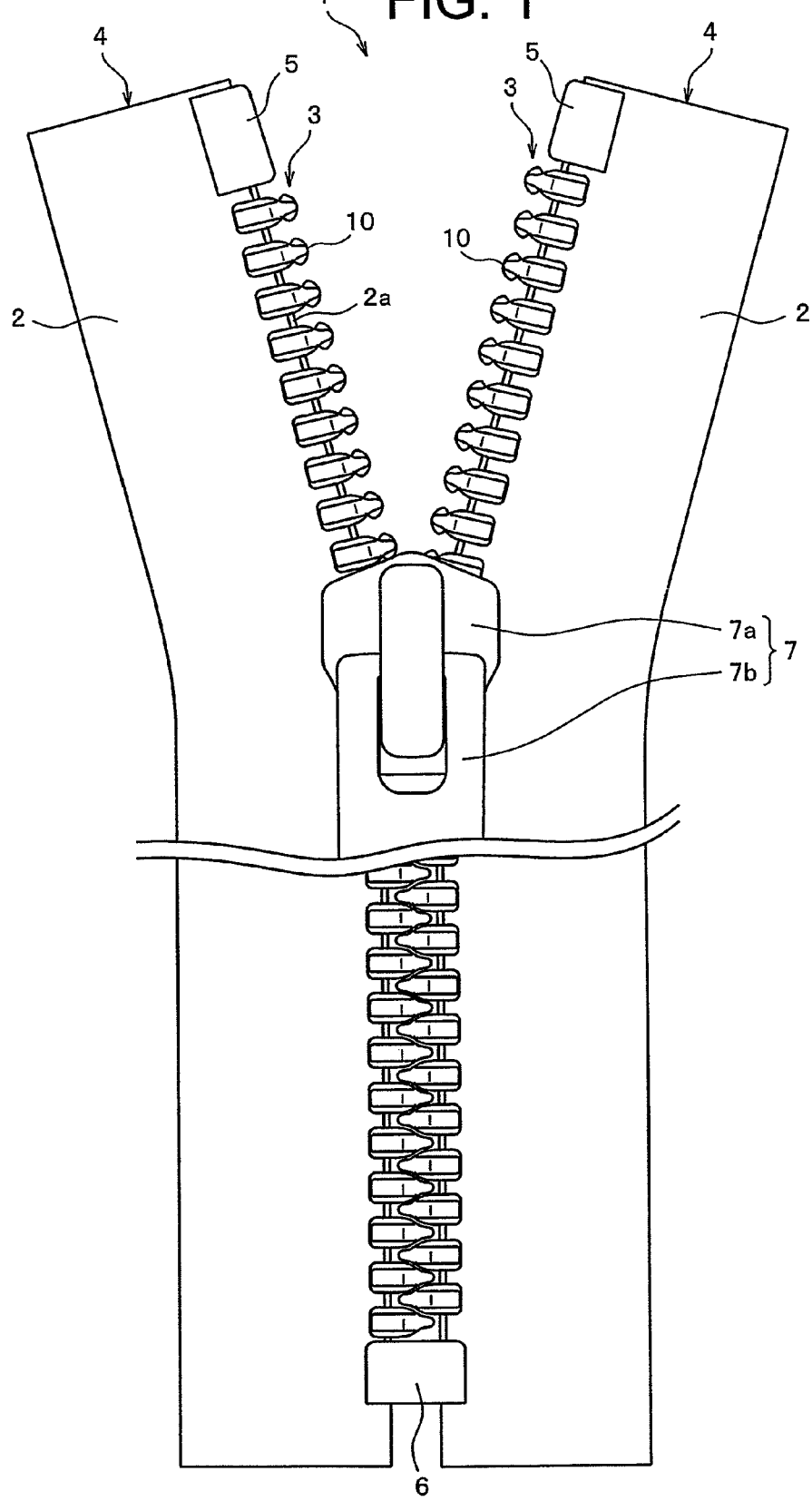
FIG. 1 is a front view illustrating a slide fastener according to a first embodiment of the invention.
Figure 2:
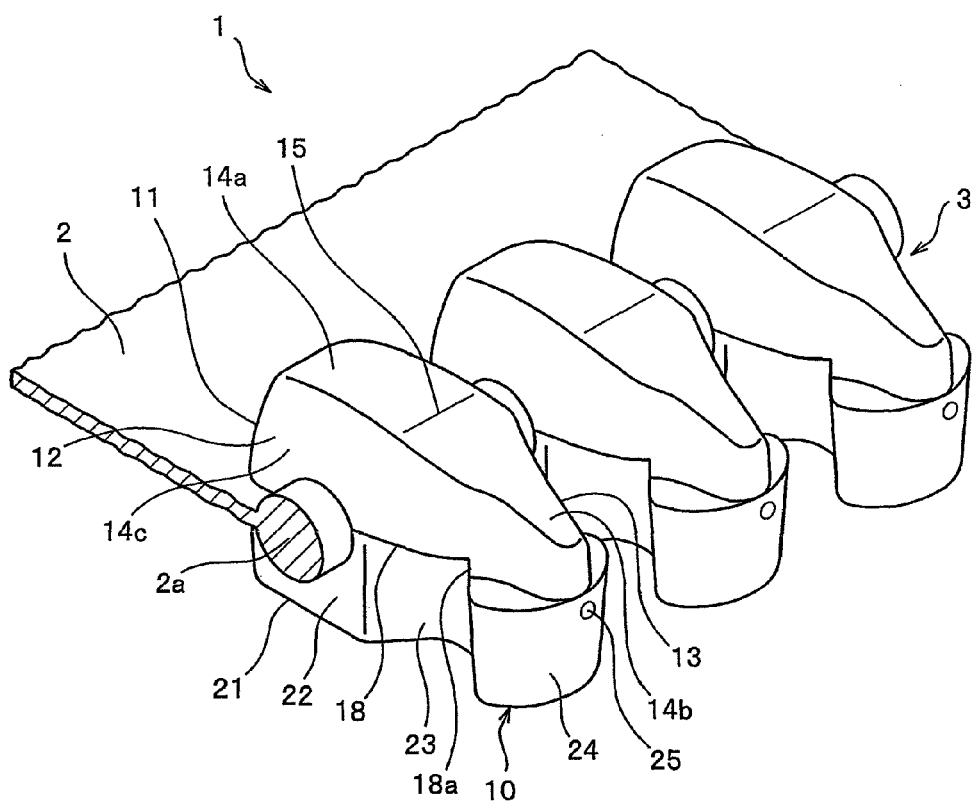
FIG. 2 is a perspective view of a fastener element used in the slide fastener.

FIG. 1 is front view of a slide fastener according to a first embodiment, and FIG. 2 is a perspective view of a fastener element used in the slide fastener. FIGS. 3 to 6 are schematic diagrams when the fastener element is viewed from various directions.

Further, in the following description, a forward/rearward direction refers to a length direction of a fastener tape in the slide fastener, and a sliding direction of a slider when the slide fastener is closed is a forward direction and a sliding direction of the slider when the slide fastener is opened is a rearward direction.

Further, a leftward/rightward direction refers to a tape width direction of the fastener tape, and left and right sides when the slide fastener is viewed from a front side are leftward and rightward directions, respectively. An upward/downward direction refers to an front/back direction of the tape perpendicular to a tape surface of the fastener tape, and a side where a tab of the slider is disposed with respect to the fastener tape is an upward direction and an opposite side thereof is a downward direction. In addition, in order to lucidly describe the feature of the invention, in the fastener element, a tape length direction (forward/rearward direction) is referred to as an element width direction and a tape width direction (leftward/rightward direction) is referred to as an element length direction.

As illustrated in FIG. 1, a slide fastener 1 of the first embodiment includes a pair of left and right fastener stringers 4 where element rows 2 are formed in the left and right fastener tapes 2, and a slider 7 slidably attached along the left and right element rows 3.

The pair of left and right fastener stringers 4 has fastener tapes 2, element rows 3 formed at opposite tape marginal parts of the fastener tapes 2, upper stoppers 5 fixed to the fastener tapes 2 at front end sides of the left and right element rows 3, and lower stoppers 6 fixed to the fastener tapes 2 at a rear end side of the left and right element rows 3, respectively. The left and right fastener tapes 2 have core portions 2a swelling in a tape front/back direction at opposite tape marginal parts.

The left and right element rows 3 include a plurality of synthetic resin fastener elements 10 attached to the taper marginal parts (element attaching parts) having the core portions 2a of the fastener tapes 2 at a predetermined interval.

In the first embodiment, the fastener elements 10 and the upper and lower stoppers 5 and 6 are injection-molded of a polyacetal based thermoplastic synthetic resin uniformly mixed with flat metal foil of aluminum or an aluminum alloy.

Further, in the invention, a kind of a synthetic resin constituting the fastener elements 10 and the upper and lower stoppers 5 and 6 is not specifically limited, but the above-described polyacetal based synthetic resin has permeability, and thus gloss by the metal foil can be stably obtained even when the metal foil is dispersed in the synthetic resin by selecting the polyacetal based synthetic resin as a material of the fastener elements 10 and the upper and lower stoppers 5 and 6.

In this case, metal foil of aluminum or an aluminum alloy whose average particle diameter is controlled to be equal to or more than 3 μm and equal to or less than 8 μm is used as the metal foil mixed with the synthetic resin. In this way, as an average particle size of the metal foil is controlled to be equal to or more than 3 μm, gloss having a high-grade sense can be achieved in the entire fastener elements 10 and strengths of the fastener elements 10 or the upper and lower stoppers 5 and 6 can be enhanced.

Further, an average diameter of the metal foil is controlled to be equal to or less than 8 μm, and thus the fastener elements 10 and the upper and lower stoppers 5 and 6 can be prevented from individually glittering, and gloss with a high-grade sense can be stably achieved in the fastener elements 10 or the upper and lower stoppers 5 and 6. In addition, if an average particle diameter of the metal foil is equal to or less than 8 μm, the synthetic resin is not fragmented even if a plurality of metal foil pieces is mixed with the synthetic resin, and thus strengths of the fastener elements 10 or the upper and lower stoppers 5 and 6 are prevented from being lowered due to the mixing of the metal foil.

In addition, a thickness of the metal foil mixed with the synthetic resin is set to be equal to or more than 0.1 μm and equal to or less than 0.4 μm. In this way, the metal foil has a thickness of not less than 0.1 μm and not more than 0.4 μm, and thus the fastener elements 10 and the upper and lower stoppers 5 and 6 can have brilliancy and clearness, a flow of the melted resin in the cavity during injection-molding can become stable, and generation of a weld mark can be effectively restrained.

Further, in the first embodiment, an amount (mixed amount) of metal foil mixed with the synthetic resin is set to be equal to or more than 0.4 wt % and equal to or less than 5.0 wt %. Accordingly, even when the flat metal foil is contained in a synthetic resin, the fastener elements 10 and the upper and lower stoppers 5 and 6 may be configured to be lightweight and inexpensive, for example, as compared with the fastener elements or the upper and lower stoppers made of a metal (copper alloy) according to the related art. Further, the fastener elements 10 or the upper and lower stoppers 5 and 6 can be restrained from glittering and gloss having a high-grade sense can be stably obtained.

The fastener element 10 of the first embodiment formed of the synthetic resin mixed with the metal foil as described above includes an upper element part (first element half part) 11 disposed on a first surface which is an outer surface of the fastener tape 2, and a lower element part (second element half part) 21 disposed on a second surface which is a back surface of the fastener tape 2. In this case, the upper element part 11 of the fastener element 10 is an exposed surface side exposed from the slide fastener 1 to the outside.

The upper element part 11 of the fastener element 10 includes a first body portion 12 sandwiching the tape marginal part of the fastener tape 2 with a second body portion 22 of the lower element part 21 to be described below, and a first head portion 13 having a thin end and extending toward an outer side of the tape from the first body portion 12.

In the first body portion 12, in order to secure a sticking strength with the fastener tape 2, an element width size at an end corner (lower end portion) of a side contacting the fastener tape 2 is set to have a predetermined size. In this case, an element width size at a lower end portion of the first body portion 12 is set to have the same size as, for example, an element width size of the fastener element of a synthetic resin according to the related art. Further, for example, when a sticking strength with the fastener tape 2 can be sufficiently obtained, an element width size at a lower end portion of the first body portion 12 may also be set to be smaller than an element width size according to the related art, and if necessary, may also be set to be larger than an element width size according to the related art.

Figure 5:
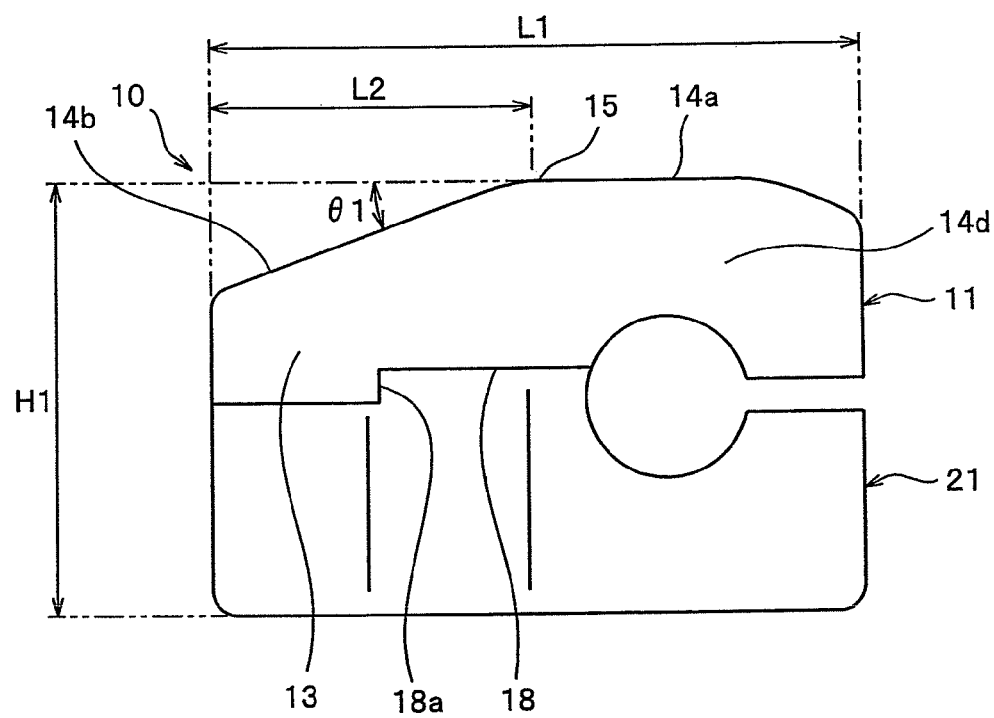
FIG. 5 is a schematic diagram when the fastener element is viewed from a rear side.

A first element surface 14a which is an upper surface of the upper element part 11 is disposed at a location the most distant from the tape surface of the fastener tape 2 toward the front/back direction of the tape in the first body portion 12 and a portion of the first head portion 13 on the first body portion 12 side. As illustrated in FIG. 5, the first element surface 14a has a flat surface portion formed in a flat shape on the first head portion 13 side, and a curved surface portion disposed at the side of the tape inner than the flat surface portion and formed in a curved surface shape, and the curved surface portion is formed such that a height size of the fastener element 10 in a tape back/front direction gradually decreases toward the inner side of the tape.

Further, a second element surface 14b inclined downward toward a tip end of the first head portion 13 with respect to the first element surface 14a is disposed on the upper surface side of the first head portion 13, and a height size of the fastener element in the tape front/back direction (upper/lower direction) gradually decreases toward a tip end of the first head portion 13 due to the second element surface 14b. In this case, the second element surface 14b itself is formed to be flat, and an inclination angle θ1 of the second element surface 14b with respect to the first element surface 14a is set to 20°.

In addition, an inclination starting portion 15 which starts a downward inclination of the second element surface 14b is set between the first element surface 14a and the second element surface 14b. In this case, when a maximum value of a size of the fastener element 10 in an element length direction (tape width direction) is a size L1 and a size from a tip end of the first head portion 13 to the inclination starting portion 15 in the element length direction (tape width direction) is a size L2, the inclination starting portion 15 is set at a location where the size L2 is equal to or larger than 45% of the size L1. Accordingly, an area of the flat surface portion in the first element surface 14a may be easily regulated to a suitable range as will be described below.

In the upper element part 11 of the first embodiment, an area of the flat surface portion of the first element surface 14a and an area (that is, an area of the second element surface 14b) of the flat surface portion of the second element surface 14b are set to be equal to or more than 0.4 mm² and equal to or less than 4.0 mm², respectively. If an area of the flat surface portion is equal to or more than 0.4 mm², gloss obtained by the metal foil can be uniformly viewed from the flat surface portions, and thus a texture like the texture of the metallic fastener element can be given to the fastener element 10. Further, if an area of the flat surface portion is equal to or less than 4.0 mm², a weld mark may not stand out even when generated in the narrow flat surface portion, and thus it becomes easy for the weld mark to be mixed with the gloss of the flat surface portion.

In the first body portion 12 of the upper element part 11 of the first embodiment, and a portion of the first head portion 13 on the first body portion 12 side, a third element surface 14c inclined downward toward a front side from the first and second element surfaces 14a and 14b, and a fourth element surface 14d inclined downward toward a rear side from the first and second element surfaces 14a and 14b are disposed such that a size of the upper element part 11 in the tape length direction gradually decreases toward an upper side.

Figure 6:
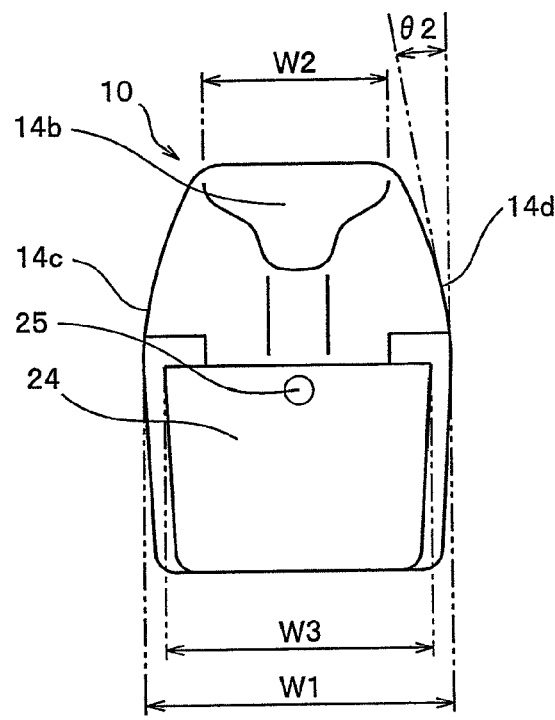
FIG. 6 is a schematic diagram when the fastener element is viewed from a widthwise side of a tape.
Figure 7:
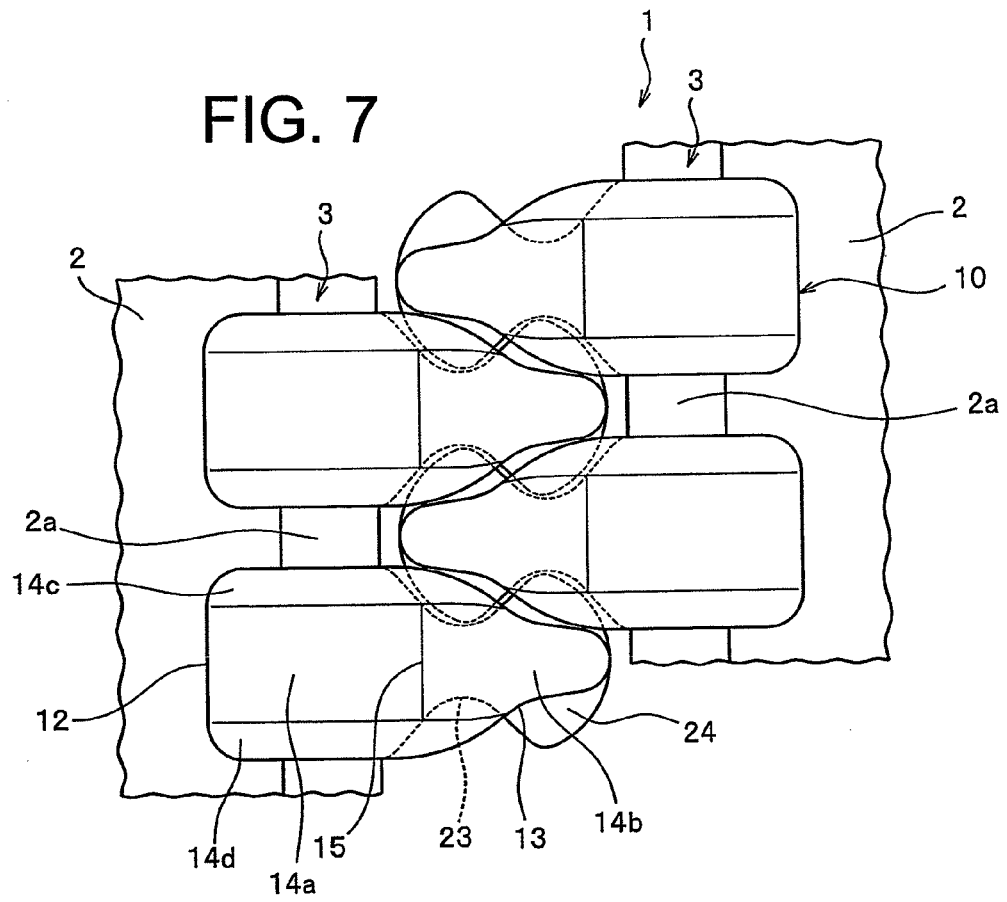
FIG. 7 is a front view illustrating a state where left and right fastener elements of the slide fastener are engaged with each other.

In this case, as illustrated in FIG. 6, the third and fourth element surfaces 14c and 14d are formed in a curved surface shape having a small curvature, but the third and fourth element surfaces may also be formed in a flat surface shape in the invention. Further, when the third and fourth element surfaces are formed in a flat surface shape, areas of the third and fourth element surfaces may be set to be equal to or more than 0.4 mm² and equal to or less than 4.0 mm², respectively for the same reason as in the above-described case of the first and second element surfaces 14a and 14b.

Figure 3:
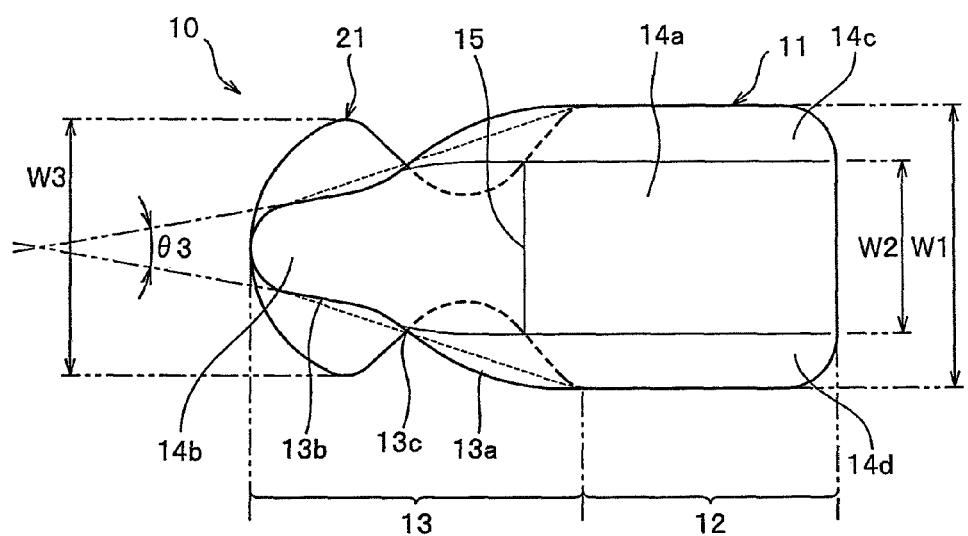
FIG. 3 is a top view of the fastener element.
Figure 4:
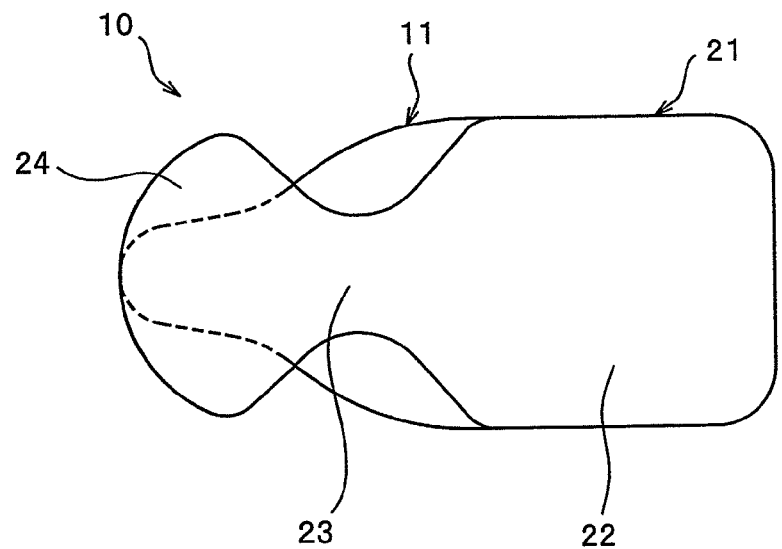
FIG. 4 is a bottom view of the fastener element.

Further, as illustrated in FIG. 6, in the third and fourth element surfaces 14c and 14d, an inclination angle θ2 inclined with respect to the element upward and downward direction is set to 10°. Accordingly, as illustrated in FIGS. 3 and 6, the size (element width size) of the first element surface 14a of the first body portion 12 in the tape length direction may be set such that a maximum value W2 of the size of the first element surface 14a in the tape length direction is smaller than 70% of a maximum value W1 (an element width size at a lower end portion of the first body portion 12) of the size of the first body portion 12 in the tape length direction. In addition, in the first embodiment, the maximum value W2 is set to a size of approximately 62% of the maximum value W1. Accordingly, when the slide fastener 1 of the first embodiment is viewed from a front side, the forms of the fastener elements 10 of a synthetic resin may be viewed like the metallic fastener element.

Further, the first head portion 13 in the upper element part 11 extends up to a tip end of the lower element part 21, and is formed to have a shape having a thin end where a size in the tape length direction gradually decreases from a base end bonded to the first body portion 12 of the first head portion 13 toward a tip end thereof. For this reason, the second element surface 14b disposed at an upper surface side of the first head portion 13 is also formed such that a size in the tape length direction gradually decreases toward a tip end of the first head portion 13.

As the first head portion 13 has the above-described form, an outer appearance of the fastener element 10 may be made to be close to the metallic fastener element. Even if the fastener elements 10 receives a force (a force for pulling up the fastener elements 10) in the tape front/back direction in the state where the left and right fastener elements 10 are engaged with each other, the engagement of the fastener elements 10 is prevented from being simply released, and the engagement state may be maintained.

In addition, the first head portion 13 has a first narrow portion 13a disposed on the first body portion 12 side, and a second narrow portion 13b disposed at an element tip end side from the first narrow portion 13a via a curved portion 13c, and for example, when a marginal part at a base end portion of the first head portion 13 and a marginal part at a tip end portion of the first head portion 13 are connected to each other with a line, the first narrow portion 13a is formed to expand to the outer side of the line and the second narrow portion 13b is formed to be concave to the inner side of the line. In this way, as the first narrow portion 13a and the second narrow portion 13b are provided in the first head portion 13, an outer appearance of the fastener element 10 can be made to be closer to the metallic fastener element.

Further, in the first embodiment, as illustrated in FIG. 3, an inner angle θ3 at a tip end portion (second narrow portion 13b) of the first head portion 13 is set to 20°, and a tip end of the first head portion 13 has such a curved surface shape as is chamfered at the same time. Accordingly, an outer appearance of the fastener element 10 can be made to be close to the metallic fastener element, and an aesthetic sense of the fastener element 10 can be enhanced.

In addition, in the invention, an inner angle θ3 at a tip end portion of the first head portion 13 refers to an inner angle at a point where extension lines are drawn along a front side surface and a rear side surface at a portion where an element width size decreases at a predetermined rate at a tip end side of the first head portion 13, for example, when a tip end portion of the first head portion 13 is formed in a curved surface shape as in the first embodiment.

The lower element part 21 in the fastener element 10 of the first embodiment is integrally formed with the upper element part 11, and is disposed on a surface side which is not exposed to the outside from the slide fastener 1.

The lower element part 21 includes a second body portion 22 having a predetermined size in a tape length direction and sandwiching a tape marginal part of the fastener tape 2 with the first body portion 12, a neck portion 23 extending toward the outside of the tape from the second body portion 22 and having a shape bound at the front and back in the tape length direction, and a second head portion 24 extending from a tip end portion of the neck portion 23 and swelling to the front and rear sides in the tape length direction.

Further, as illustrated in FIGS. 3 and 6, in the lower element part 21, a maximum value W3 of the size in the tape length direction in the second head portion 24 is set to a size of 88% of the maximum value W1 of the size in the tape length direction in the second body portion 22. Accordingly, when the left and right fastener elements 10 are engaged with each other, a sufficient engaging strength capable of enduring the use of the slide fastener 1 can be stably obtained and an engaging operation when the left and right fastener elements 10 are engaged with each other can be smoothly performed.

In the fastener element 10 of the first embodiment, a gate trace 25 formed during injection molding of the fastener element 10 is set in the lower element part 21. Accordingly, even when a weld mark is formed near a gate opening during injection molding, if the gate opening (gate trace 25) is set the lower element part 21 on a surface side which is not exposed to the outside, the weld mark formed near the gate trace 25 cannot be easily viewed from the outside, and thus an outer appearance quality of the fastener element can be prevented from being lowered.

Further, in the fastener element 10 of the first embodiment, a step portion 18a as illustrated in FIG. 5 is provided at a border portion 18 between the upper element part 11 and the lower element part 21, and a height size at a portion on the fastener tape 2 side from the step portion 18a in the lower element part 21 is set to be larger than a portion on the element tip end side from the step portion 18a.

By making the height size of the lower element part 21 on the fastener tape 2 side from the step portion 18a through the provision of the step portion 18a, when the left and right fastener elements 10 are engaged with each other as illustrated in FIG. 6, for example, by sliding the slider (not illustrated), a gap may be provided between the first head portion 13 of the upper element part 11 and the second head portion 24 in the fastener element 10 on the opposite engagement side. Accordingly, when the left and right fastener elements 10 are engaged with each other, for example, even if the left and right fastener elements 10 deviate from a relative height location in an element guide path of the slider, an engaging operation of the fastener elements 10 can be smoothly performed.

Further, in the fastener element 10 of the first embodiment, a maximum value W1 of a size in a tape length direction is set to be equal to or more than 1.2 mm and equal to or less than 3.5 mm, a maximum value L1 of a size in the tape width direction is set to be equal to or more than 3.0 mm and equal to or less than 5.0 mm, and a maximum value H1 of a size in the tape front/back direction is set to be equal to or more than 2.0 mm and equal to or less than 3.5 mm. As the fastener element 10 is formed within the above-described size range, gloss having a high-grade sense can be achieved in the entire element and a weld mark may not be viewed even when the weld mark is generated on a surface of the element.

The slider 7 in the first embodiment has the same shape as the slider 7 generally known in the related art. In detail, the slider 7 has a slider body 7a and a tab 7b. The slider body 7a has an upper blade, a lower blade, a diamond connecting the upper and lower blades with a front end portion, upper and lower flange portions disposed at left and right marginal parts of the upper and lower blades, and a tab installing column installed on an upper surface of the upper blade. Further, the tab 7b is rotatably attached to the tab installing column.

A rear opening is disposed at a rear end portion of the slider body 7a, and collars are disposed on the front end side of the slider 7 and at left and right sides of the diamond. Further, a substantially Y-shaped element guide path communicating the rear opening and the left and right collars is disposed between the upper and lower blades of the slider body 7a.

Further, the slider body 7a and the tab 7b in the first embodiment are formed by injection-molding an impermeable nylon based thermoplastic synthetic resin, to form a formed body having a predetermined shape, and then attaching metal foil which is the same as the metal foil mixed in the fastener element 10 to the formed body obtained.

In this case, the method of attaching the metal foil to the formed body is not particularly limited, but it is possible to easily attach the metal foil to the formed body, for example, through painting for ejecting the metal foil of aluminum or an aluminum alloy to the formed body. Accordingly, even if the slider body 7a and the tab 7b are injection-molded of an impermeable thermoplastic synthetic resin, gloss having a high-grade sense can be stably given to the slider body 7a and the tab 7b.

In addition, the kind of the synthetic resin forming the slider body 7a and the tab 7b is not specifically limited, but strength of the slider 7 can be easily secured by selecting the above-described nylon based thermoplastic synthetic resin as a material for the slider body 7a and the tab 7b.

In the above-described slide fastener 1 of the first embodiment, the fastener elements 10 and the upper and lower stoppers 5 and 6 are injection-molded of a synthetic resin with which the flat metal foil whose average particle diameter is controlled to a predetermined range is uniformly mixed. For this reason, the fastener elements 10 and the upper and lower stoppers 5 and 6 have both an advantage of a synthetic resin of being inexpensive and lightweight and an advantage of a metal of having strength and gloss having a high-grade sense.

Further, an average particle diameter of the metal foil mixed with the synthetic resin is as small as not more than 8 µm, and thus a problem of deteriorating a flow of a melted resin in a cavity of the mold during injection molding, generating a stain in the flow of the melted resin, or the like can be effectively restrained, so that a weld mark can be restrained from being generated in the fastener element 10 and the upper and lower stoppers 5 and 6.

Further, the fastener element 10 in the first embodiment has a shape and a size different from those of the fastener element of a general synthetic resin according to the related art as described above, and the first and second element surfaces of the fastener element 10 have flat surface portions whose areas are controlled to a predetermined range.

Accordingly, when the slide fastener 1 is viewed from the front side, an outer appearance or a texture of the fastener element 10 can look like the metallic fastener element further, and even if the weld mark is formed when the fastener element 10 is injection-molded, the weld mark can be made difficult to be visually recognized relatively and the weld mark can be mixed with the gloss of the fastener element 10 due to a size of the flat surface portion and a difference (reflection degree of light) between reflection directions of light on surfaces having different angles.

Thus, it is possible to very effectively prevent an outer appearance defect from being generated in the slide fastener due to a weld mark, and significantly enhance an outer appearance quality or a design of the slide fastener 1.

Further, in the slide fastener 1 of the first embodiment, as illustrated in FIG. 1, large flat surfaces are formed on the upper and lower surfaces of the upper and lower stoppers 5 and 6. For this reason, when a weld mark is formed on the upper and lower surfaces of the upper and lower stoppers 5 and 6, the weld mark may be visually-recognized. In this case, a weld mark is made relatively difficult to be recognized visually by providing a stepped portion or a concaved recess on the upper and lower surfaces of the upper and lower stoppers 5 and 6 or forming the upper and lower surfaces of the upper and lower stoppers 5 and 6 to be concave or convex surface, making it possible to mix the weld mark with gloss.

In addition, in the slide fastener 1 of the first embodiment, the third and fourth element surfaces 14c and 14d of the upper element part 11 are disposed in the first body portion 12 and a portion of the first head portion 13 on the first body portion 12 side. However, in the invention, the third and fourth element surfaces 14c and 14d of the upper element part 11 may be disposed at least at the first body portion 12.

Figure 8:
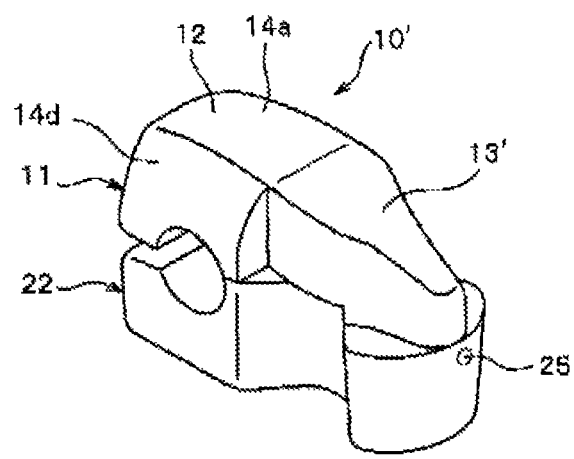
FIG. 8 is a perspective view illustrating the fastener element according to a variant of the first embodiment.

Thus, for example, as a fastener element 10' which is a variant of the first embodiment is illustrated in FIG. 8, the third and fourth element surfaces 14c and 14d are not provided at a first head portion 13', and the front side surface and the rear side surface of the first head portion 13' may be formed in a direction perpendicular to the tape surface of the fastener tape 2 such that a longitudinal sectional shape of the first head portion 13' corresponds to a shape of the upper surface thereof. In this case, the first head portion 13' is formed in such a form where the front side and rear side thereof are cutaway. Even by doing this, the shape of the first fastener element 10' can be finished as in the metallic fastener element to achieve the same effect as that of the fastener element 10 of the first embodiment.

Second Embodiment

Figure 9:
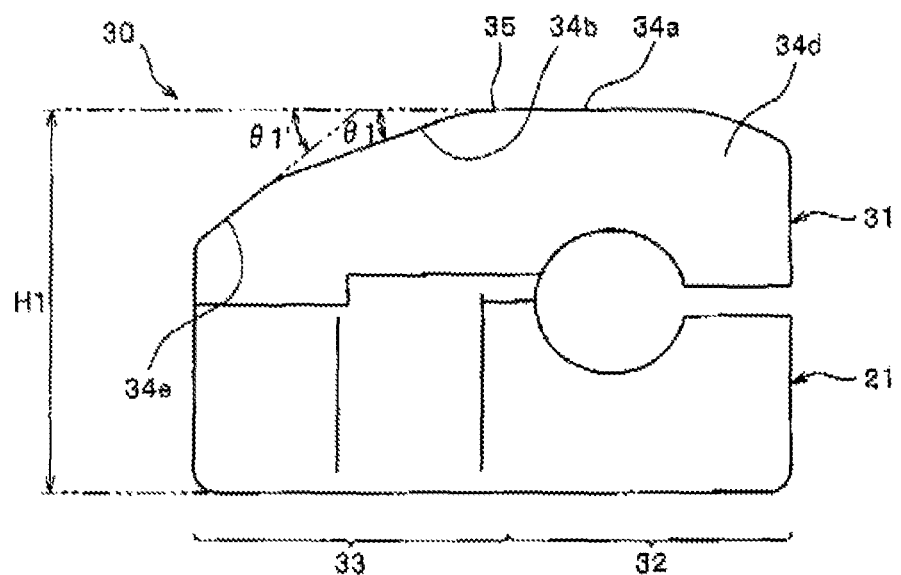
FIG. 9 is a schematic diagram when a fastener element used in a slide fastener according to a second embodiment of the invention is viewed from a rear side.

FIG. 9 is a side view illustrating a fastener element used in a slide fastener according to the second embodiment of the invention.

Further, in the slide fastener according to the second embodiment, and the slide fasteners according to the third to fifth embodiments to be described below basically have the same configuration as the slide fastener 1 in the above-described first embodiment except that the forms of the upper element parts of the fastener elements are different. Thus, in the second embodiment and the third to fifth embodiments to be described below, the same configurations as the members and portions described in the above-described first embodiment are denoted by the same reference numerals, and a description thereof will be omitted.

As in the above-described first embodiment, a fastener element 30 in the second embodiment is formed by injection-molding a polyacetal based thermoplastic synthetic resin with which flat metal foil of aluminum or an aluminum alloy is uniformly mixed.

An upper element part 31 of the fastener element 30 includes a first body portion 32 sandwiching a tape marginal part of the fastener tape 2 with the second body portion 22, and a first head portion 33 extending toward an outer side of the tape from the first body portion 32 and having a thin end.

A first element surface 34a which is an upper surface of the upper element part 31 is disposed at the first body portion 32 and a portion of the first head portion 33 on the first body portion 32 side. As in the above-described fastener element 10 of the first embodiment, the first element surface 34a has a flat surface portion formed in a flat shape at the first head portion 33 side, and a curved surface portion disposed on the tape inner side of the flat surface portion.

Further, a second element surface 34b inclined downward at an inclination angle θ1 with respect to the first element surface 34a, and a fifth element surface 34e having an inclination angle θ1' larger than the inclination angle θ1 of the second element surface 34b are disposed on the upper surface side of the first head portion 33. In this case, the inclination angle θ1 of the second element surface 34b is set to 20°, and the inclination angle θ1' of the fifth element surface 34e is set to 40°.

In addition, an inclination starting portion 35 which starts a downward inclination of the second element surface 34b is set between the first element surface 34a and the second element surface 34b. Then, when a maximum value of a size of the fastener element 30 in an element length direction is a size L1 and a size from a tip end of the first head portion 33 to the inclination starting portion 35 in an element length direction (tape width direction) is a size L2, the inclination starting portion 35 is set to a location where the size L2 is equal to or larger than 45% of the size L1. Further, accordingly, an area of the flat surface portion of the first element surface 34a and areas of the second and fifth element surfaces 34b and 34e are set to be equal to or more than 0.4 mm$^2$ and equal to or less than 4.0 mm$^2$.

In the fastener element 30 of the second embodiment, a third element surface inclined downward toward the front side from the first and second element surfaces 34a and 34b, and a fourth element surface 34d inclined downward toward the rear side from the first and second element surfaces 34a and 34b are disposed at the first body portion 32 and a portion of the first head portion 33 on the first body portion 32 side.

As in the above-described fastener element 10 in the first embodiment, the fastener element 30 has both an advantage of a synthetic resin of being more inexpensive and lighter than the metallic fastener element and an advantage of a metal of having strength and gloss having a high-grade sense. Further, when the slide fastener is viewed from the front side, an outer appearance or a texture of the fastener element 30 can be viewed like the metallic fastener element.

In addition, even if metal foil is mixed with a synthetic resin forming the fastener element 30, a weld mark can be restrained from being generated in the fastener element 30, and even if a weld mark is formed in the fastener element 30, the weld mark can be made difficult to be visually recognized relatively and the weld mark can be mixed with the gloss.

Third Embodiment

Figure 10:
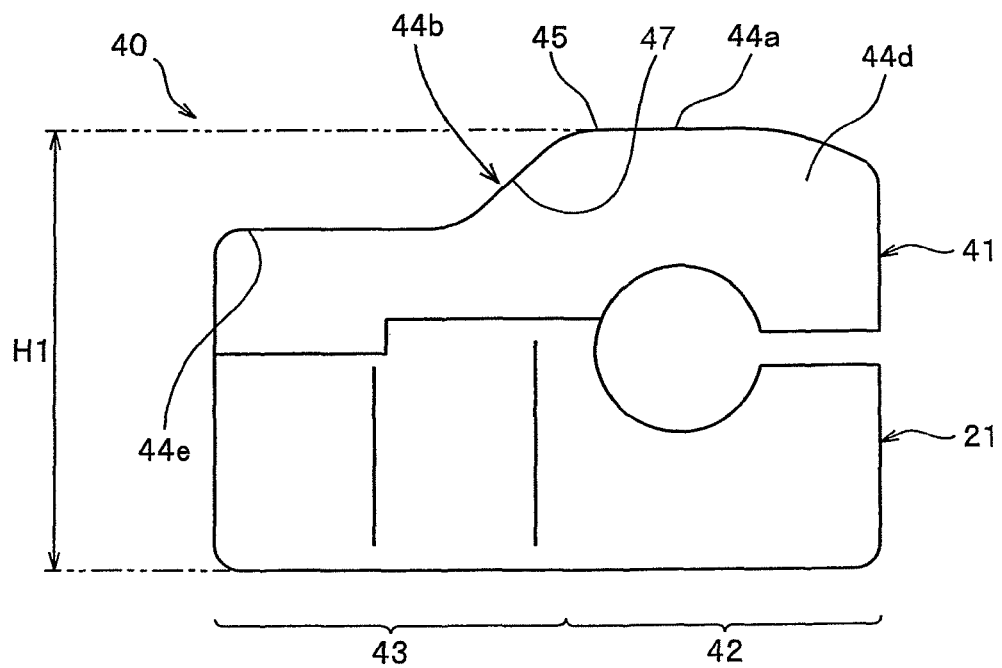
FIG. 10 is a schematic diagram when a fastener element used in a slide fastener according to a third embodiment of the invention is viewed from a rear side.

FIG. 10 is a side view illustrating a fastener element used in a slide fastener according to the third embodiment of the invention.

As in the above-described first embodiment, a fastener element 40 in the third embodiment is formed by injection-molding a polyacetal based thermoplastic synthetic resin with which flat metal foil of aluminum or an aluminum alloy is uniformly mixed.

An upper element part 41 of the fastener element 40 includes a first body portion 42, and a first head portion 43 having a thin end. Further, a first element surface 44a which is an upper surface of the upper element part 41 is disposed at the first body portion 42 and a portion of the first head portion 43 on the first body portion 42 side. The first element surface 44a has a flat surface portion formed in a flat shape at the first head portion 43 side, and a curved surface portion disposed on the tape inner side of the flat surface portion.

A second element surface 44b inclined downward with respect to the first element surface 44a and a fifth element surface 44e disposed at a tip end side of the first head portion 43 with respect to the second element surface 44b and parallel to the flat surface portion of the first element surface 44a are disposed on the upper surface side of the first head portion 43. In this case, an inclination angle θ1 of a downward inclination surface 47 is set to 40°, and the fifth element surface 44e itself is formed to be flat.

Further, an inclination starting portion 45 which starts a downward inclination of the second element surface 44b is set between the first element surface 44a and the second element surface 44b. Then, when a maximum value of a size of the fastener element 40 in an element length direction is a size L1 and a size from a tip end of the first head portion 43 to the inclination starting portion 45 in an element length direction (tape width direction) is a size L2, the inclination starting portion 45 is set to a location where the size L2 is equal to or larger than 45% of the size L1. In addition, accordingly, an area of the flat surface portion of the first element surface 44a and an area of the fifth element surface 44e are set to be equal to or more than 0.4 mm$^2$ and equal to or less than 4.0 mm$^2$, respectively.

In the fastener element 40 of the third embodiment, a third element surface inclined downward toward the front side and a fourth element surface 44d inclined downward toward the rear side are disposed at the first body portion 42 and a portion of the first head portion 43 on the first body portion 42 side.

As in the above-described first and second embodiments, the fastener element 40 according to the third embodiment has both an advantage of a synthetic resin of being more inexpensive and lighter than the metallic fastener element and an advantage of a metal of having strength and gloss having a high-grade sense. Further, when the slide fastener is viewed from the front side, an outer appearance or a texture of the fastener element 40 can be viewed like the metallic fastener element.

In addition, even if metal foil is mixed with a synthetic resin forming the fastener element 40, a weld mark can be restrained from being generated in the fastener element 40, and even if a weld mark is formed in the fastener element 40, the weld mark can be made difficult to be visually recognized relatively and the weld mark can be mixed with the gloss.

Fourth Embodiment

Figure 11:
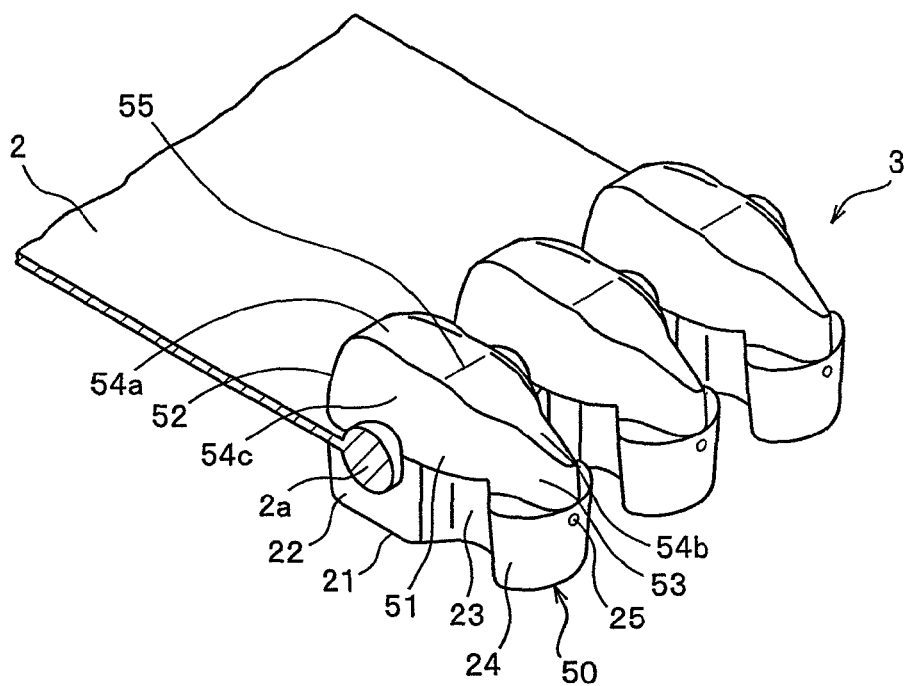
FIG. 11 is a perspective view of a fastener element used in a slide fastener according to a fourth embodiment of the invention.
Figure 12:
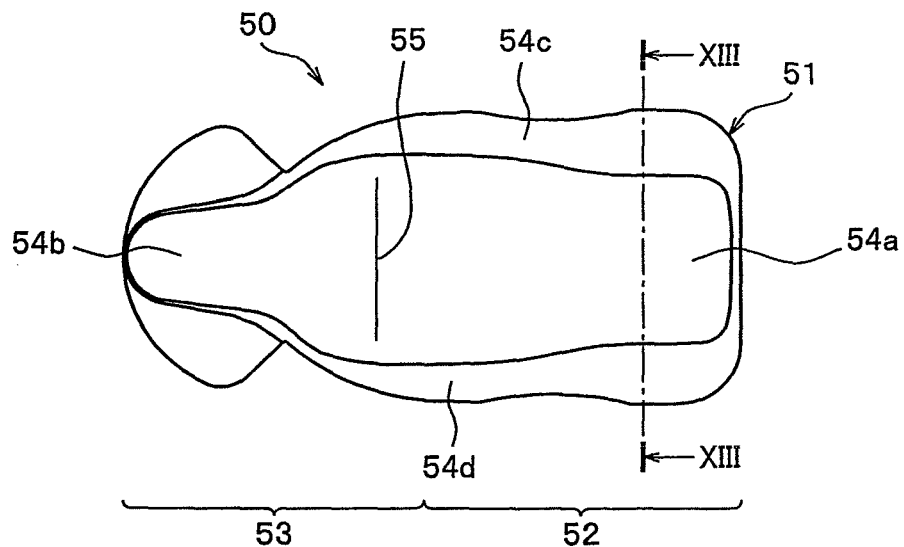
FIG. 12 is a top view of the fastener element.
Figure 13:
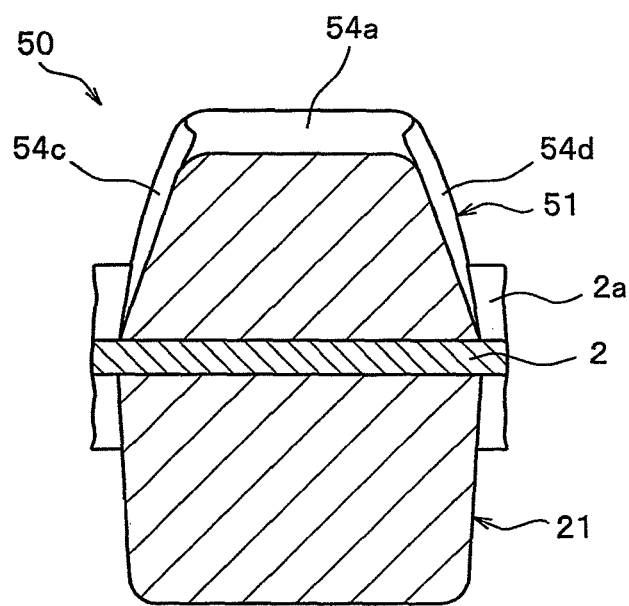
FIG. 13 is a sectional view taken along line XIII-XIII of FIG. 12.

FIG. 11 is a perspective view illustrating a fastener element used in a slide fastener according to the fourth embodiment of the invention. Further, FIG. 12 is a top view of the fastener element, and FIG. 13 is a sectional view taken along line XIII-XIII of FIG. 12.

As in the above-described first embodiment, a fastener element 50 in the fourth embodiment is formed by injection-molding a polyacetal based thermoplastic synthetic resin with which flat metal foil of aluminum or an aluminum alloy is uniformly mixed.

An upper element part 51 of the fastener element 50 includes a first body portion 52, and a first head portion 53 having a thin end. A first element surface 54a which is an upper surface of the upper element part 51 is disposed at the first body portion 52 and a portion of the first head portion 53 on the first body portion 52 side. The first element surface 54a has a flat surface portion formed in a flat shape, and a curved surface portion disposed on the tape inner side of the flat surface portion.

Further, a second element surface 54b inclined downward at an inclination angle θ1 with respect to the first element surface 54a is disposed on the upper surface side of the first head portion 53. In this case, the inclination angle θ1 of the second element surface 54b is set to 20°.

In the fourth embodiment, the first element surface 54a is formed such that a size in the element width direction (tape length direction) gradually decreases toward the tape inner side of the fastener tape 2, that is, a marginal end at the front side of the first element surface 54a and a marginal end at the rear side thereof approach each other toward the tape inner side of the fastener tape 2.

Further, the second element surface 54b is formed such that a size in the tape length direction gradually decreases toward a tip end of the first head portion 53, that is, a marginal end at the front side on the second element surface 54b and a marginal end at the rear side thereof approach each other toward a tip end of the first head portion 53.

In addition, an inclination starting portion 55 which starts a downward inclination of the second element surface 54b is set between the first element surface 54a and the second element surface 54b. Then, when a maximum value of a size of the fastener element 50 in an element length direction is a size L1 and a size from a tip end of the first head portion 53 to the inclination starting portion 55 in an element length direction (tape width direction) is a size L2, the inclination starting portion 55 is set to a location where the size L2 is equal to or larger than 45% of the size L1. Further, accordingly, an area of the flat surface portion of the first element surface 54a and an area of the second element surface 54b are set to be equal to or more than 0.4 mm$^2$ and equal to or less than 4.0 mm$^2$.

In the fastener element 50 of the fourth embodiment, a third element surface 54c inclined downward toward the front side from the first and second element surfaces 54a and 54b, and a fourth element surface 54d inclined downward toward the rear side from the first and second element surfaces 54a and 54b are disposed at the first body portion 52 and a portion of the first head portion 53 on the first body portion 52 side.

In this case, the third and fourth element surfaces 54c and 54d are formed in a curved surface shape having a small curvature, respectively. Further, in the invention, the third and fourth element surfaces may be formed in a flat surface shape, in which case areas of the third and fourth element surfaces are preferably set to be equal to or more than 0.4 mm$^2$ and equal to or less than 4.0 mm$^2$.

Further, the third and fourth element surfaces 54c and 54d are formed to widen a width such that an upper marginal end and a lower marginal end on the third and fourth element surfaces 54c and 54d are spaced apart from each other toward the tape inner side of the fastener tape 2.

The fastener element 50 according to the fourth embodiment also has the same effect as those of the above-described first to third embodiments. Further, the fastener element 50 according to the fourth embodiment is formed such that a marginal end at the front side of the first element surface 54a and a marginal end at the rear side thereof approach each other toward the tape inner side of the fastener tape 2, and thus when the fastener element 50 is viewed from the front side (upper side), the fastener element 50 can be seen to be thinner and a shape of the fastener element 50 can be made to be closer to the shape of the metallic fastener element according to the related art.

Fifth Embodiment

Figure 14:
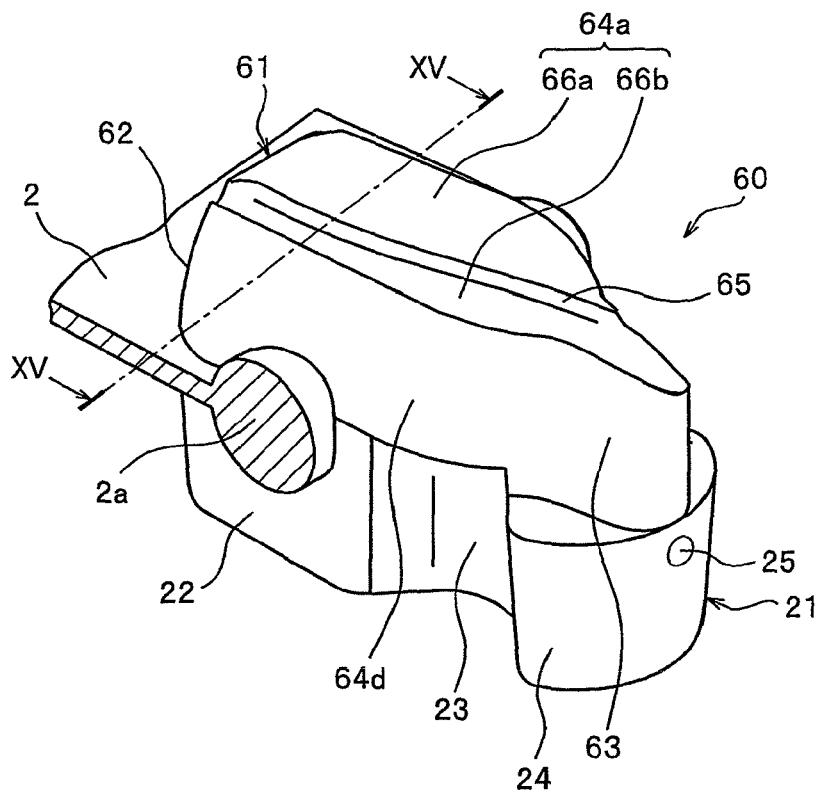
FIG. 14 is a perspective view of a fastener element used in a slide fastener according to a fifth embodiment of the invention.
Figure 15:
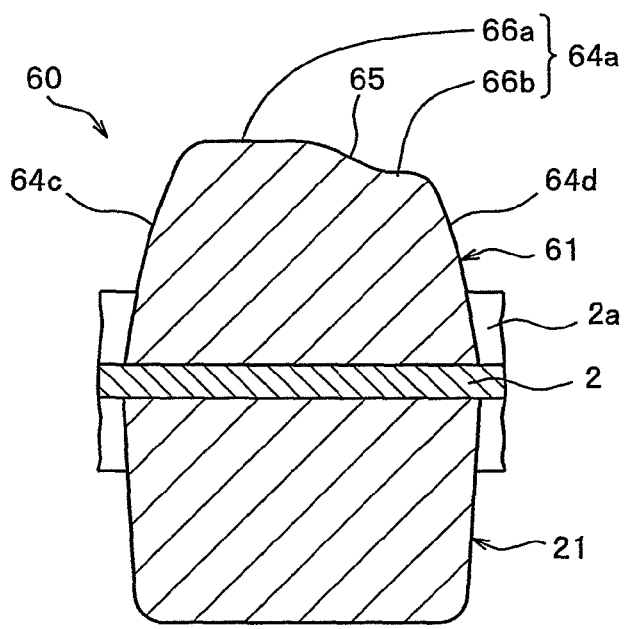
FIG. 15 is a sectional view taken along line XV-XV of FIG. 14.

FIG. 14 is a perspective view of a fastener element used in a slide fastener according to the fifth embodiment of the invention. Further, FIG. 15 is a sectional view taken along line XV-XV illustrated in FIG. 14.

As in the above-described first embodiment, a fastener element 60 in the fifth embodiment is formed by injection-molding a polyacetal based thermoplastic synthetic resin with which flat metal foil of aluminum or an aluminum alloy is uniformly mixed.

An upper element part 61 of the fastener element 60 includes a first body portion 62, and a first head portion 63 having a thin end. Further a first element surface 64a which is an upper surface of the upper element part 61 is disposed along the first body portion 62 and the first head portion 63 on the whole. A stepped portion 65 is formed on the first element surface 64a along a tip end of the first head portion 63 from a marginal end at the tape inner side of the first body portion 62. The stepped portion 65 is disposed to be partially curved so as to be inclined with respect to a tape width direction.

By providing the stepped portion 65, a first flat surface portion 66a formed in a flat shape and a second flat surface portion 66b formed in a shape flatter than the first flat surface portion on the tape surface side of the fastener tape 2 via the stepped portion 65 are disposed on the first element surface 64a. In this case, an area of the first flat surface portion 66a and an area of the second flat surface portion 66b are set to be equal to or more than 0.4 mm$^2$ and equal to or less than 4.0 mm$^2$. Further, in the invention, a concaved recess is provided on the first element surface 64a of the fifth embodiment instead of the stepped portion 65, and the first element surface 64a may be divided into the first flat surface portion 66a and the second flat surface portion 66b.

Further, a third element surface 64c inclined downward toward the front side from the first element surface 64a, and a fourth element surface 64d inclined downward toward the rear side from the first element surface 64a are disposed at the first body portion 62 and the first head portion 63. In this case, the third and fourth element surfaces 64c and 64d are formed in a curved surface shape having a small curvature, respectively, but the third and fourth element surfaces may be formed in a flat surface shape in the invention.

As in the above-described first to fourth embodiments, the fastener element 60 according to the fifth embodiment also has both an advantage of a synthetic resin of being more inexpensive and lighter than the metallic fastener element and an advantage of a metal of having strength and gloss having a high-grade sense, and when the slide fastener is viewed from the front side, an outer appearance or a texture of the fastener element 60 can be viewed like the metallic fastener element. Further, a weld mark can be restrained from being generated in the fastener element 60, and even if a weld mark is formed in the fastener element 60, the weld mark can be made difficult to be visually recognized relatively.

Sixth Embodiment

Figure 16:
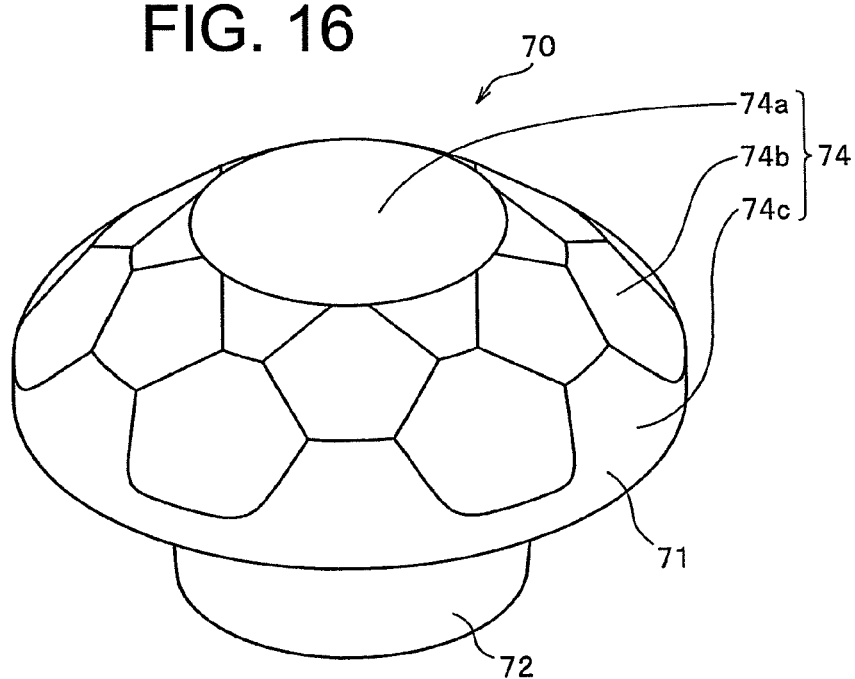
FIG. 16 is a perspective view illustrating a female member of a snap button according to a sixth embodiment of the invention.
Figure 17:
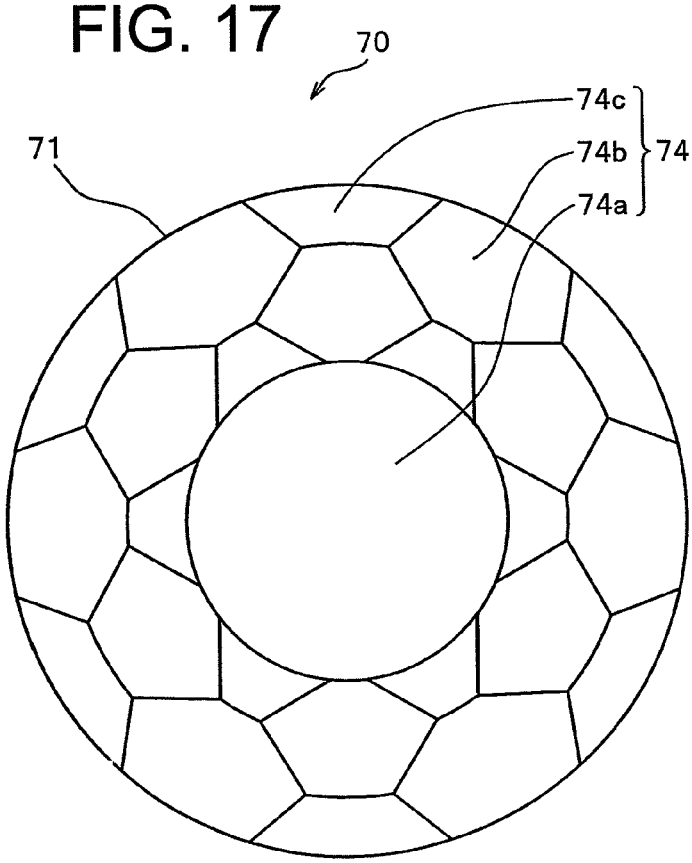
FIG. 17 is a top view of the female member.

Next, a case where the fastening product according to the invention is a snap button will be described. Here, FIG. 16 is a perspective view illustrating a female member of a snap button according to the sixth embodiment of the invention. Further, FIG. 17 is a top view of the female member.

A female member 70 for a snap button in the sixth embodiment is formed by injection-molding a polyacetal based thermoplastic synthetic resin with which flat metal foil of aluminum or an aluminum alloy is uniformly mixed. In this case, an average particle diameter of the metal foil is controlled to be not less than 3 μm and not more than 8 μm. Further, in the invention, the kind of the synthetic resin forming the female member 70 is not specifically limited if the synthetic resin has permeability.

The female member 70 has a cover body 71 formed in a convex shape whose central portion expands upward, and a cylindrical attaching portion 72 extending to a rear surface side of the cover body, and a male member (not illustrated) for a snap button is configured to be detached from the attaching portion 72.

A first surface 74 on a side exposed to the outside of the cover body 71 has a first circular flat surface portion 74a disposed at a central portion thereof, a plurality of second polygonal flat surface portions 74b disposed around the first flat surface portion 74a, and a curved surface portion 74c disposed at an outer peripheral portion thereof to surround the second flat surface portions 74b. In this case, an area of the first circular flat surface portion 74a and areas of the second polygonal flat surface portions 74b are set to be equal to or more than 0.4 mm² and equal to or less than 4.0 mm², respectively.

The female member 70 for a snap button according to the sixth embodiment has both an advantage of a synthetic resin of being inexpensive and light and an advantage of a metal of having strength and gloss having a high-grade sense. Further, when the female member 70 is viewed from the front side, an outer appearance or a texture of the female member 70 can be viewed like the metallic member.

In addition, even if metal foil is mixed with a synthetic resin forming the female member 70, a weld mark can be restrained from being generated in the female member 70, and even if a weld mark is formed in the female member 70, the areas of the first and second flat surface portions 74a and 74b of the cover body 71 are set to the above-described range, and thus the weld mark can be made difficult to be visually recognized relatively and the weld mark can be mixed with the gloss.

Seventh Embodiment

Figure 18:
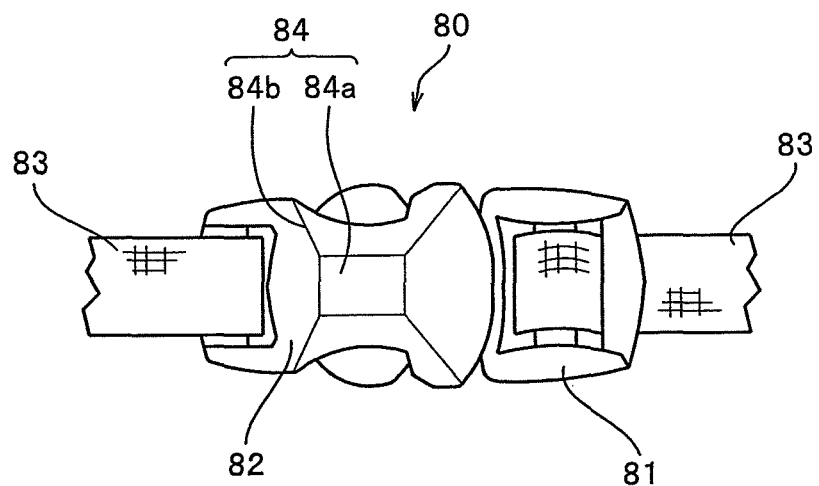
FIG. 18 is a front view illustrating a buckle according to a seventh embodiment of the invention.

Next, a case where a fastening product according to the invention is a buckle will be described. Here, FIG. 18 is a front view illustrating a buckle according to the seventh embodiment of the invention.

A buckle 80 in the seventh embodiment has a male member 81 attached to one belt 83, and a female member 82 attached to another belt 83 and from which the female member 81 can be detached.

In this case, the male member 81 and the female member 82 are formed by injection-molding a polyacetal based thermoplastic synthetic resin with which flat metal foil of aluminum or an aluminum alloy is uniformly mixed. In this case, an average particle diameter of the metal foil is controlled to be equal to or more than 3 μm and equal to or less than 8 μm. Further, in the invention, the kind of the synthetic resin forming the male member 81 and the female member 82 is not specifically limited if the synthetic resin has permeability.

The female member 82 of the seventh embodiment has a first surface 84 on a side exposed to the outside, and a second surface disposed on a side opposite to the first surface, and a plurality of flat surface portions 84a classified by ridges 84b is formed on the first surface 84 and the second surface. In this case, areas of the flat surface portions 84a are set to be equal to or more than 0.4 mm² and equal to or less than 4.0 mm². Meanwhile, all the portions exposed when the male member 81 of the seventh embodiment is engaged with and placed in the female member 82 are formed in curved surface shapes.

The buckle 80 according to the seventh embodiment has both an advantage of a synthetic resin of being inexpensive and light and an advantage of a metal of having strength and gloss having a high-grade sense, and an outer appearance or a texture thereof can be viewed like the metallic member.

Further, even if metal foil is mixed with a synthetic resin forming the buckle 80, a weld mark can be restrained from being generated in the buckle 80. In addition, the area of the flat surface portion 84a disposed in the female member 82 is set to the above-described range and all the portions exposed when the male member 81 is engaged with the female member 82 are formed in curved surface shapes, and thus even if a weld mark is formed in the buckle 80, the weld mark can be made difficult to be visually recognized relatively and the weld mark can be mixed with the gloss.

Eighth Embodiment

Figure 19:
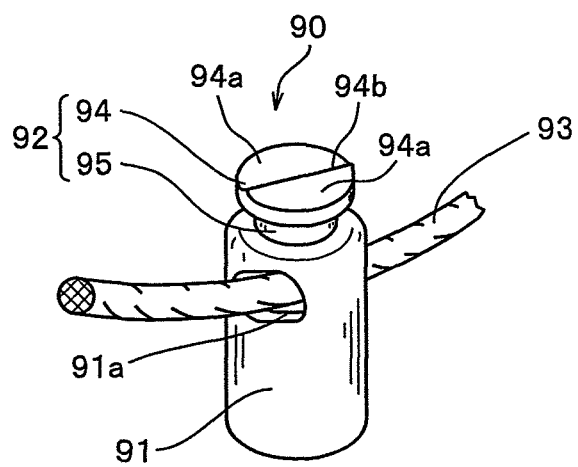
FIG. 19 is a perspective view illustrating a cord stopper according to an eighth embodiment of the invention.

Next, a case where a fastening product according to the invention is a cord stopper will be described. Here, FIG. 19 is a perspective view illustrating a cord stopper according to the eighth embodiment of the invention.

A cord stopper 90 in the eighth embodiment has a cord stopper body 91 where an insertion hole 91a through which a cord 93 is inserted is formed, a sliding body 92 slidably installed in the cord stopper body 91 upward and downward, and a resilient member (not shown) pressing the sliding body 92 upward.

In this case, the cord stopper body 91 and the sliding body 92 are formed by injection-molding a polyacetal based thermoplastic synthetic resin with which flat metal foil of aluminum or an aluminum alloy is uniformly mixed. In this case, an average particle diameter of the metal foil is controlled to be equal to or more than 3 μl and equal to or less than 8 μm. Further, in the invention, the kind of the synthetic resin constituting the cord stopper body 91 and the sliding body 92 is not specifically limited if the synthetic resin has permeability.

In the eighth embodiment, the cord stopper body 91 is formed in a substantially cylindrical shape, and has a cylindrical side surface as a surface exposed to the outside, and a circular bottom surface. Further, the sliding body 92 has a disk-shaped head portion 94 and a shaft portion 95 extending from the head portion 94 and inserted into the cord stopper body 91.

In this case, the bottom surface of the cord stopper body 91 and the upper surface of the head portion 94 are classified by a ridge disposed in a radial direction of the bottom surface and a ridge 94b disposed in a radial direction of the upper surface of the head portion, and two flat surface portions 94a are formed on the bottom surface of the cord stopper body 91 and the upper surface of the head portion 94, respectively. In this case, areas of the flat surface portions 94a are set to be equal to or more than 0.4 mm$^2$ and equal to or less than 4.0 mm$^2$.

The cord stopper 90 according to the eighth embodiment has both an advantage of a synthetic resin of being inexpensive and light and an advantage of a metal of having strength and gloss having a high-grade sense, and an outer appearance or a texture thereof can be viewed like the metallic member.

Further, even if metal foil is mixed with a synthetic resin forming the cord stopper 90, a weld mark can be restrained from being generated in the cord stopper 90. Further, the side surface of the cord stopper body 91 is formed in a curved surface and the areas of the bottom surface of the cord stopper body 91 and the flat surface portions 94a on the upper surface of the head portion 94 are set to the above-described range, and thus even if a weld mark is formed in the cord stopper 90, the weld mark can be made difficult to be visually recognized relatively and the weld mark can be mixed with the gloss.

DESCRIPTION OF REFERENCE NUMERALS

1 Slide fastener
2 Fastener tape
2a Core portion
3 Element row
4 Fastener stringer
5 Upper stopper
6 Lower stopper
7 Slider
7a Slider body
7b Tab
10, 10' Fastener element
11 Upper element part
12 First body portion
13, 13' First head portion
13a First narrow portion
13b Second narrow portion
13c Curved portion
14a First element surface
14b Second element surface
14c Third element surface
14d Fourth element surface
15 Inclination starting portion
18 Border portion
18a Step portion
21 Lower element part
22 Second body portion
23 Neck portion
24 Second head portion
25 Gate trace
30 Fastener element
31 Upper element part
32 First body portion
33 First head portion
34a First element surface
34b Second element surface
34d Fourth element surface
34e Fifth element surface
35 Inclination starting portion
40 Fastener element
41 Upper element part
42 First body portion
43 First head portion
44a First element surface
44b Second element surface
44d Fourth element surface
44e Fifth element surface
45 Inclination starting portion
50 Fastener element
51 Upper element part
52 First body portion
53 First head portion
54a First element surface
54b Second element surface
54c Third element surface
54d Fourth element surface
55 Inclination starting portion
60 Fastener element
61 Upper element part
62 First body portion
63 First head portion
64a First element surface
64c Third element surface
64d Fourth element surface
65 Stepped portion
66a First flat surface portion
66b Second flat surface portion
70 Female member for snap button
71 Cover body
72 Attaching portion
74 First surface
74a First flat surface portion
74b Second flat surface portion
74c Curved surface portion
80 Buckle
81 Male member
82 Female member
83 Belt
84 First surface
84a Flat surface portion
84b Ridge
90 Cord stopper
91 Cord stopper body
91a Insertion hole
92 Sliding body
93 Cord
94 Head portion
94a Flat surface portion
94b Ridge
95 Shaft portion
H1 Maximum value of size of fastener element in tape front/back direction
L1 Maximum value of size of fastener element in tape width direction (element length direction)
L2 Size from tip end of first head portion to inclination starting portion in tape width direction
W1 Maximum value of size of fastener element in tape length direction (element width direction)
W2 Maximum value of size in tape length direction on first element surface
W3 Maximum value of size in tape length direction in second head portion
θ1, θ1' Inclination angle of second element surface
θ2 Inclination angle of third and fourth element surfaces
θ3 Inner angle of tip end portion of first head portion

The invention claimed is:

1. A slide fastener comprising:
a pair of left and right fastener tapes;
a plurality of fastener elements made of a synthetic resin and attached along opposing side edges of the fastener tapes, wherein flat metal foil containing aluminum is mixed with the synthetic resin, and an average particle diameter of the metal foil is between 3 µm and 8 µm and upper and lower stoppers, wherein each fastener element has a body portion fixed to one of the fastener tapes and a head portion protruding toward a tip end via a neck portion;

each fastener element has a first element half part disposed on a front surface side of the fastener element in a tape front and back direction, and a second element half part disposed on a rear surface side of the fastener element in the tape front and back direction, the first element half part has a first element surface and a second element surface, the second element surface slopes downward toward the tip end of the head portion from the first element surface so that a size of the first element half part in the tape front and back direction decreases towards the tip end;

the first element surface is formed such that a size of the first element surface gradually decreases in a tape length direction toward a tape inner side of the fastener tape, and the second element surface is formed such that a size of the second element surface gradually decreases in the tape length direction toward the tip end; and at least one of the first element surface and the second element surface is a flat surface with an area between 0.4 mm² and 4.0 mm².

2. The slide fastener according to claim 1, wherein the metal foil contained in the synthetic resin is between 0.4 wt % and 5.0 wt %.

3. The slide fastener according to claim 1, wherein the synthetic resin has permeability.

4. The slide fastener according to claim 1, wherein the first element half part further has a third element surface sloped downward toward a first side of the fastener element in the tape length direction from the first element surface, and a fourth element surface sloped downward toward an opposite, second side of the fastener element from the first element surface.

5. The slide fastener according to claim 1, wherein the second element half part includes a gate trace formed during injection-molding of the fastener element.

6. The slide fastener according to claim 1, wherein a size of the fastener element in the tape length direction is between 1.2 mm and 3.5 mm, a size of the fastener element in a tape width direction is between 3.0 mm and 5.0mm, and a size of the fastener element in the tape front and back direction is between 2.0 mm and 3.5 mm.

7. The slide fastener according to claim 1, further comprising a slider having metal foil of aluminum is attached to a surface thereof.

8. The slide fastener according to claim 7, wherein the slider is formed of an impermeable synthetic resin.

* * * * *

UNITED STATES PATENT AND TRADEMARK OFFICE
CERTIFICATE OF CORRECTION

PATENT NO. : 9,259,061 B2  
APPLICATION NO. : 13/808662  
DATED : February 16, 2016  
INVENTOR(S) : Masayoshi Kojima Page 1 of 1

It is certified that error appears in the above-identified patent and that said Letters Patent is hereby corrected as shown below:

Specification

In column 5, line 11, delete "fiat" and insert -- flat --, therefor.

In column 5, line 44, delete "uniformely" and insert -- uniformly --, therefor.

In column 9, line 17, delete "in" and insert -- In --, therefor.

In column 12, line 65, after "set" insert -- in --.

Claims

In column 23, line 3, in claim 1, after "8 μm" insert -- ; --.

In column 24, line 19, in claim 6, delete "5.0mm," and insert -- 5.0 mm, --, therefor.

Signed and Sealed this  
Tenth Day of May, 2016

Michelle K. Lee  
*Director of the United States Patent and Trademark Office*